US009247288B2

(12) United States Patent
Riedl

(10) Patent No.: US 9,247,288 B2
(45) Date of Patent: Jan. 26, 2016

(54) TECHNIQUE FOR EFFECTIVELY DELIVERING TARGETED ADVERTISEMENTS THROUGH A COMMUNICATIONS NETWORK HAVING LIMITED BANDWIDTH

(75) Inventor: Steven E. Riedl, Superior, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 2607 days.

(21) Appl. No.: 10/639,070

(22) Filed: Aug. 12, 2003

(65) Prior Publication Data

US 2005/0039205 A1 Feb. 17, 2005

(51) Int. Cl.
| | |
|---|---|
| H04N 21/438 | (2011.01) |
| H04N 21/234 | (2011.01) |
| H04N 21/235 | (2011.01) |
| H04N 21/258 | (2011.01) |
| H04N 21/2668 | (2011.01) |
| H04N 21/435 | (2011.01) |
| H04N 21/44 | (2011.01) |
| H04N 21/6543 | (2011.01) |
| H04N 21/658 | (2011.01) |
| H04N 21/81 | (2011.01) |
| H04N 21/466 | (2011.01) |

(52) U.S. Cl.
CPC ......... *H04N 21/4383* (2013.01); *H04N 21/235* (2013.01); *H04N 21/23424* (2013.01); *H04N 21/25891* (2013.01); *H04N 21/2668* (2013.01); *H04N 21/435* (2013.01); *H04N 21/44016* (2013.01); *H04N 21/4667* (2013.01); *H04N 21/6543* (2013.01); *H04N 21/6582* (2013.01); *H04N 21/812* (2013.01)

(58) Field of Classification Search
CPC ............ H04N 21/812; H04N 21/4532; H04N 7/17318; H04N 21/44222; H04N 21/25891
USPC ............. 725/46, 45, 60, 61, 37, 32–36, 9–21, 725/95, 97
See application file for complete search history.

(56) References Cited

U.S. PATENT DOCUMENTS

| 4,546,382 A | 10/1985 | McKenna et al. |
| 4,602,279 A | 7/1986 | Freeman |
| 4,930,120 A * | 5/1990 | Baxter et al. .................. 370/487 |

(Continued)

OTHER PUBLICATIONS

WO 01/91474.*

*Primary Examiner* — Mark D Featherstone
*Assistant Examiner* — Anthony Bantamoi
(74) *Attorney, Agent, or Firm* — Gazdzinski & Associates, PC

(57) ABSTRACT

When an advertisement break is detected on a program channel stream, demographic data is obtained which is descriptive of the subscribers who are currently watching material from the program channel stream, and one or more streams containing substitute advertisements are generated based on the demographic data. The substitute advertisements in each stream, thus generated, are targeted at a different demographic group of the subscribers. The number of substitute advertisement streams corresponds to the number of unused transmission channels allocated for transmission of such streams. Groups of subscribers' set-top terminals (STTs) are directed to tune to the allocated transmission channels during the advertisement break to receive the substitute advertisement streams, respectively. Consequently, the subscribers are shown the substitute, targeted advertisements instead of the regularly-scheduled advertisements.

35 Claims, 8 Drawing Sheets

(56) References Cited

U.S. PATENT DOCUMENTS

| | | |
|---|---|---|
| 5,155,591 A | 10/1992 | Wachob |
| 5,600,364 A | 2/1997 | Hendricks et al. |
| 5,758,257 A * | 5/1998 | Herz et al. ............. 725/116 |
| 5,774,170 A | 6/1998 | Hite et al. |
| 5,914,945 A * | 6/1999 | Abu-Amara et al. ........ 370/329 |
| 6,002,393 A | 12/1999 | Hite et al. |
| 6,047,327 A | 4/2000 | Tso et al. |
| 6,081,830 A * | 6/2000 | Schindler ................ 709/204 |
| 6,134,532 A | 10/2000 | Lazarus et al. |
| 6,161,142 A | 12/2000 | Wolfe et al. |
| 6,182,050 B1 | 1/2001 | Ballard |
| 6,216,129 B1 | 4/2001 | Eldering |
| 6,446,261 B1 | 9/2002 | Rosser |
| 6,463,585 B1 * | 10/2002 | Hendricks et al. ............ 725/35 |
| 6,560,578 B2 | 5/2003 | Eldering |
| 6,604,138 B1 | 8/2003 | Virine et al. |
| 6,615,039 B1 * | 9/2003 | Eldering ................... 455/418 |
| 6,615,251 B1 | 9/2003 | Klug et al. |
| 6,671,736 B2 | 12/2003 | Virine et al. |
| 6,718,551 B1 | 4/2004 | Swix et al. |
| 6,738,978 B1 | 5/2004 | Hendricks et al. |
| 6,771,290 B1 | 8/2004 | Hoyle |
| 7,100,183 B2 | 8/2006 | Kunkel et al. |
| 7,146,627 B1 | 12/2006 | Ismail et al. |
| 7,152,237 B2 | 12/2006 | Flickinger et al. |
| 7,155,508 B2 | 12/2006 | Sankuratipati et al. |
| 7,228,555 B2 | 6/2007 | Schlack |
| 7,237,250 B2 * | 6/2007 | Kanojia et al. ............. 725/36 |
| 7,246,150 B1 | 7/2007 | Donoho et al. |
| 7,577,118 B2 | 8/2009 | Haumonte et al. |
| 7,602,820 B2 | 10/2009 | Helms |
| 2001/0050901 A1 | 12/2001 | Love |
| 2002/0049902 A1 | 4/2002 | Rhodes |
| 2002/0087975 A1 * | 7/2002 | Schlack ................... 725/34 |
| 2002/0087976 A1 | 7/2002 | Kaplan et al. |
| 2002/0104083 A1 | 8/2002 | Hendricks et al. |
| 2002/0112240 A1 | 8/2002 | Bacso et al. |
| 2002/0120498 A1 | 8/2002 | Gordon |
| 2002/0123928 A1 | 9/2002 | Eldering et al. |
| 2002/0124182 A1 | 9/2002 | Bacso et al. |
| 2002/0144263 A1 * | 10/2002 | Eldering et al. ............. 725/34 |
| 2002/0166119 A1 | 11/2002 | Cristofalo |
| 2002/0178447 A1 * | 11/2002 | Plotnick et al. ............ 725/36 |
| 2003/0004810 A1 | 1/2003 | Eldering |
| 2003/0033199 A1 | 2/2003 | Coleman |
| 2003/0056217 A1 * | 3/2003 | Brooks .................... 725/46 |
| 2003/0093311 A1 | 5/2003 | Knowlson |
| 2003/0093784 A1 * | 5/2003 | Dimitrova et al. ........... 725/10 |
| 2003/0093792 A1 | 5/2003 | Labeeb |
| 2003/0101449 A1 | 5/2003 | Bentolila et al. |
| 2003/0101451 A1 | 5/2003 | Bentolila et al. |
| 2003/0110499 A1 | 6/2003 | Knudson |
| 2003/0145323 A1 | 7/2003 | Hendricks et al. |
| 2003/0149975 A1 | 8/2003 | Eldering et al. |
| 2003/0195927 A1 | 10/2003 | Virine et al. |
| 2005/0039205 A1 | 2/2005 | Riedl |
| 2005/0060742 A1 | 3/2005 | Riedl |
| 2005/0060745 A1 | 3/2005 | Riedl |
| 2005/0086691 A1 | 4/2005 | Dudkiewicz et al. |
| 2005/0114900 A1 | 5/2005 | Ladd |
| 2005/0223409 A1 * | 10/2005 | Rautila et al. ............. 725/113 |
| 2005/0289618 A1 | 12/2005 | Hardin |
| 2006/0036750 A1 | 2/2006 | Ladd |
| 2006/0171390 A1 | 8/2006 | La Joie |
| 2006/0218604 A1 | 9/2006 | Riedl |
| 2006/0248555 A1 | 11/2006 | Eldering |
| 2006/0253328 A1 | 11/2006 | Kohli et al. |
| 2006/0253864 A1 | 11/2006 | Easty |
| 2006/0277569 A1 | 12/2006 | Smith |
| 2007/0022459 A1 | 1/2007 | Gaebel, Jr. |
| 2007/0033531 A1 | 2/2007 | Marsh |
| 2007/0076728 A1 | 4/2007 | Rieger |
| 2007/0089127 A1 | 4/2007 | Flickinger et al. |
| 2007/0094691 A1 | 4/2007 | Gazdzinski |
| 2007/0113243 A1 | 5/2007 | Brey |
| 2007/0217436 A1 | 9/2007 | Markley |
| 2007/0233857 A1 | 10/2007 | Cheng et al. |
| 2007/0274400 A1 | 11/2007 | Murai |
| 2007/0276926 A1 | 11/2007 | LaJoie |
| 2008/0192820 A1 | 8/2008 | Brooks |
| 2008/0229354 A1 | 9/2008 | Morris et al. |
| 2008/0273591 A1 | 11/2008 | Brooks |

\* cited by examiner

FIG. 3
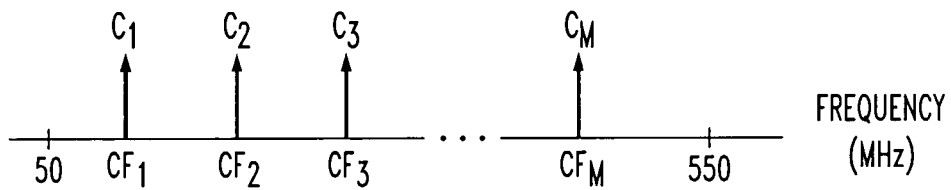
FIG. 4
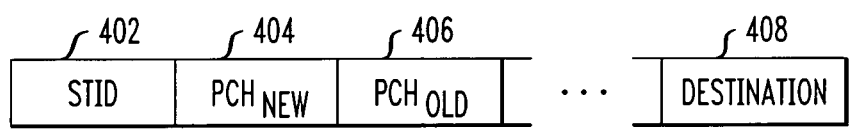
FIG. 5
432
| | 436 | 437 |
|---|---|---|
| | STID | X |
| 444-1 | MAC 1 | 4 |
| 444-2 | MAC 2 | NULL |
| | MAC 3 | 5 |
| | ⋮ | ⋮ |
| 444-L | MAC L | 5 |

| | X | INPUT PORT |
|---|---|---|
| 371-1 | 1 | NULL |
| 372-2 | 2 | 3 |
| | 3 | 11 |
| | 4 | 1 |
| | ⋮ | ⋮ |
| | K | 25 |

Table 377, columns 373, 374

| | X | $N_{PCHX}$ | ASSIGNED CARRIER |
|---|---|---|---|
| 313 | 1 | 0 | NULL |
| 311 | 2 | 12 | $C_3$ |
| | 3 | 1 | $C_{11}$ |
| | 4 | 1000 | $C_1$ |
| | ⋮ | ⋮ | ⋮ |
| | K | 5 | $C_{25}$ |

Table 300, columns 304, 306, 308

| MAC ADDRESS | AGE | SEX | HOUSEHOLD INCOME | LANGUAGE |
|---|---|---|---|---|
| MAC 1 | 29 | M | $45,000 | ENGLISH |
| MAC 2 | 56 | F | $75,000 | SPANISH |
| MAC 3 | 18 | F | 0 | ENGLISH |
| MAC 4 | X | X | X | X |
| ⋮ | ⋮ | ⋮ | ⋮ | ⋮ |
| MAC L | X | X | X | X |

Columns: 652, 653, 654, 655, 656. Rows: 645-1 ... 645-L.

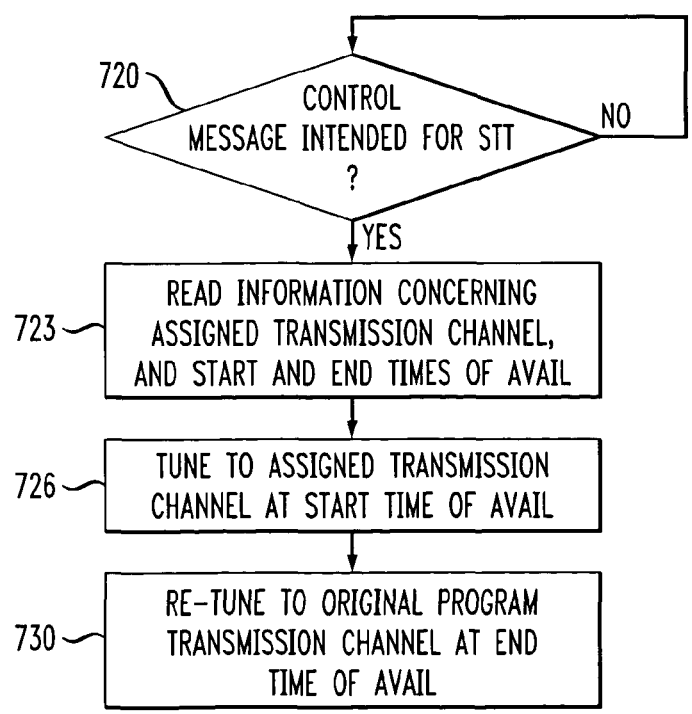

FIG. 14

720 — CONTROL MESSAGE INTENDED FOR STT? → NO (loop)
YES ↓
723 — READ INFORMATION CONCERNING ASSIGNED TRANSMISSION CHANNEL, AND START AND END TIMES OF AVAIL
726 — TUNE TO ASSIGNED TRANSMISSION CHANNEL AT START TIME OF AVAIL
730 — RE-TUNE TO ORIGINAL PROGRAM TRANSMISSION CHANNEL AT END TIME OF AVAIL

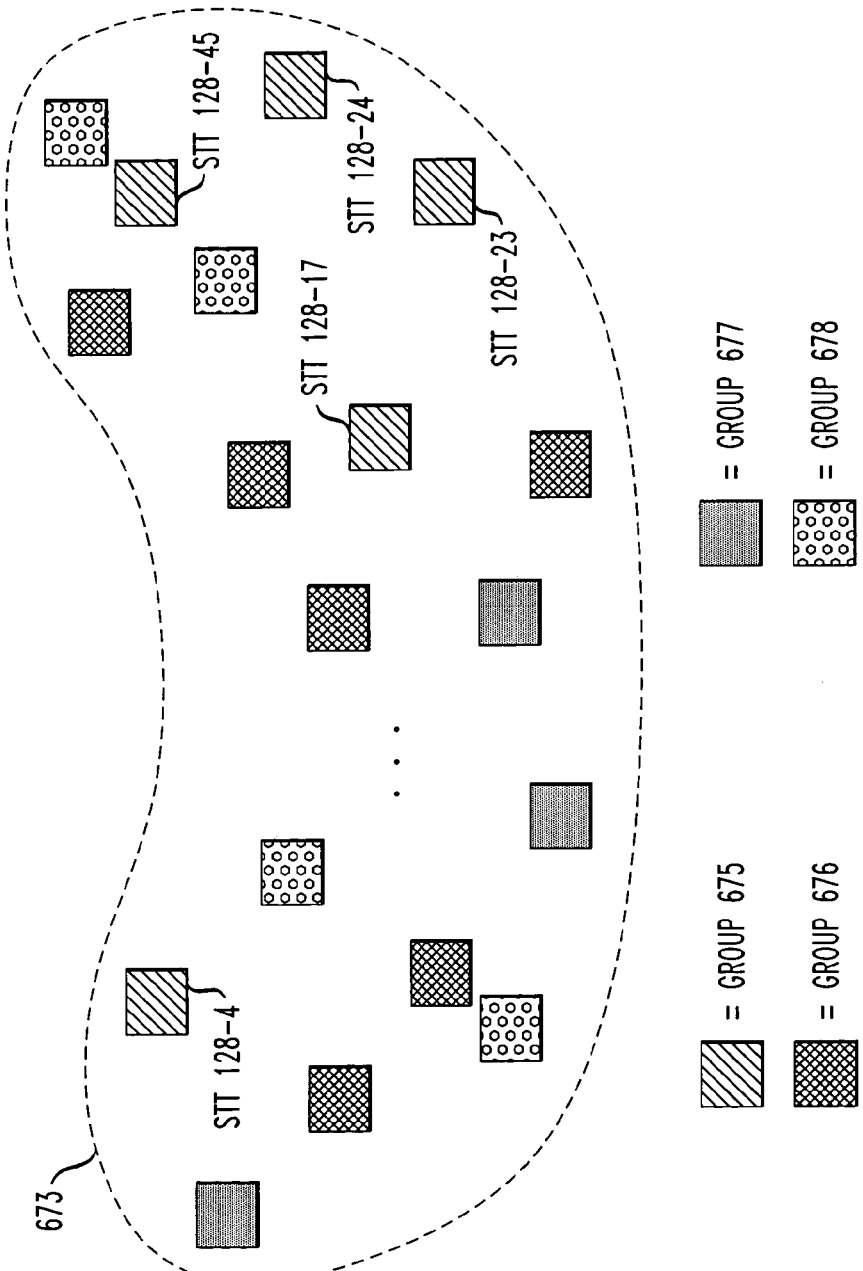

TECHNIQUE FOR EFFECTIVELY DELIVERING TARGETED ADVERTISEMENTS THROUGH A COMMUNICATIONS NETWORK HAVING LIMITED BANDWIDTH

FIELD OF THE INVENTION

The invention relates to communications systems and methods, and more particularly to a system and method for delivering programming content, along with alternate targeted advertisements, through a communications network, e.g., a cable TV network.

BACKGROUND OF THE INVENTION

In traditional cable networks, a broadcast stream containing program material, e.g., a TV show, typically contains one or more splice points (commonly referred to as advertisement breaks) allowing for the insertion of advertisements. Many cable operators utilize these splice points to insert local advertisements or for self-promotion. For example, a cable operator may broadcast an advertisement for a local car dealership at a splice point during the TV show "Friends." Although this form of advertising has been used for years, it is inefficient because in many instances the majority of subscribers watching the respective program material may not be a member of the audience for whom the advertisement is intended. For instance, in the example given above, many teenagers watch "Friends," but relatively few teenagers are potential purchasers of automobiles.

In response to this problem, an improved technique known as targeted advertising has been used recently in some cable networks. Targeted advertising generally allows a cable operator to generate one or more sets of "targeted advertisements" aimed at various demographic groups, and deliver the targeted advertisements to those groups. Several techniques exist for delivering targeted advertisements to subscribers' set-top terminals (STTs) in a cable television network. According to one such technique, a cable operator's headend facility provides one or more sets of advertisements targeted at various demographic groups. Each STT in the network receives these targeted advertisements at opportune times, such as between 2:00 am and 6:00 am when the STT is not active, and stores them in memory. Subsequently, when subscribers are watching a cable program, the STT detects an upcoming advertisement break in the program and substitutes one or more of the targeted advertisements stored in memory for the regularly scheduled advertisements. The STT may use demographic information associated with the program currently being watched, or subscriber-related data collected by the STT, to select an appropriate substitute advertisement from among those stored in memory. In accordance with this technique, the targeted advertisements are inserted into the broadcast stream being received by the STT.

In accordance with another technique, a cable operator assigns, for a given program channel, a predetermined number of transmission channels to carry alternate targeted advertisements to the subscribers watching the given program channel. Using this technique, the cable operator prepares in advance a collection of targeted advertisements, without knowledge of the make-up of the actual audience of the given program channel at an advertisement break. To generate targeted advertisements, the cable operator utilizes a database containing demographic information describing the whole subscriber base. Typically, multiple targeted advertisement streams are generated for various demographic groups identified within the subscriber base. When an advertisement break occurs, the cable operator transmits the prepared streams of targeted advertisements through the respective transmission channels. Each stream of targeted advertisements contains control information indicating the demographic group for which the advertisements are intended. An STT in the network selects one of the streams of targeted advertisements based on one or more factors. These factors may include a demographic profile associated with the TV show currently being shown, or information known about the respective STT household. The STT tunes to the appropriate transmission channel, plays the selected stream of targeted advertisements during the advertisement break, and then retunes to the original TV show channel after the advertising break ends. However, this technique proves to be ineffective especially when members of a demographic group for which a targeted advertisement is intended are not present in the actual audience of the show.

The prior art techniques described above are inefficient for other reasons as well. For example, they require the installation and maintenance on STTs in the network of special software applications that perform tasks such as monitoring a program channel for advertisement breaks, maintaining and analyzing demographic information concerning the subscriber, and selecting one or more advertisements appropriate for the subscriber household. For many cable operators, it is costly and inefficient to install and maintain software applications in large numbers of STTs in a network.

SUMMARY OF THE INVENTION

The invention is premised upon the recognition that, in prior art, a cable operator does not know which subscribers are in fact watching material from a given program channel at the moment an advertising break occurs. Consequently, the cable operator does not know precisely who the target is. Not having the capability to determine precisely who is watching material from a respective program channel at a given moment, prior art systems require the cable operator to prepare a stream of targeted advertisements well in advance of the instant when an advertising break occurs. As a result, the prior art systems fail to provide the cable operator a high level of accuracy in "targeting" advertisements.

In accordance with the invention, in response to a signal indicative of an event (e.g., an advertising break) in the delivery of programming content, an audience currently receiving the programming content is determined. Data descriptive of at least one group of members of the audience is then determined. At least one programming segment containing, e.g., targeted advertisements is generated based at least on the data. The at least one programming segment is provided, in lieu of the programming content, to the at least one group during the event.

Thus, the invention allows multiple sets of substitute advertisements to be generated, targeted at various demographic groups among the subscribers. In such case, a first specified set of set-top terminals (STTs) shows a first set of substitute advertisements, a second specified set of STTs shows a second set of substitute advertisements, etc.

In an illustrative embodiment of the invention, upon a detection of an upcoming advertising break on a program channel stream, the set-top terminals (STTs) that are currently receiving the program channel stream (the "targeted STTs) is dynamically identified. Data is obtained which is descriptive of the subscribers associated with the targeted STTs. The number of available transmission channels in the network is also determined. One or more streams of substitute advertisements targeted at all or a portion of the targeted STTs are generated. The substitute advertisements may be generated based on a variety of factors, including demographic data concerning the subscribers associated with the targeted STTs, and data indicating the number of unused transmission channels in the network.

During the advertising break, one or more streams of substitute advertisements are transmitted over one or more assigned transmission channels, respectively. The targeted STTs are directed to tune to the assigned transmission channels during the advertising break, and receive a stream of substitute advertisements. Consequently, the subscribers are shown substitute advertisements instead of the regularly-scheduled advertisements.

BRIEF DESCRIPTION OF THE DRAWING

Further objects, features and advantages of the invention will become apparent from the following detailed description taken in conjunction with the accompanying drawings showing illustrative embodiments of the invention, in which:

FIG. 3 illustrates M carriers associated with M transmission channels in a forward passband;

FIG. 4 illustrates a program channel change message from a set-top terminal (STT) to a controller in the system of FIG. 2.

FIG. 5 illustrates a table used to monitor the program channel activities of various STTs in the system of FIG. 2;

FIG. 12 illustrates the data structure of a demographic parameter database in accordance with the invention;

FIG. 13 illustrates a set of STTs currently receiving a certain program channel stream; and FIG. 14 is a flowchart describing a process performed by an STT to receive a respective targeted advertisement stream.

DETAILED DESCRIPTION

Figure 1:
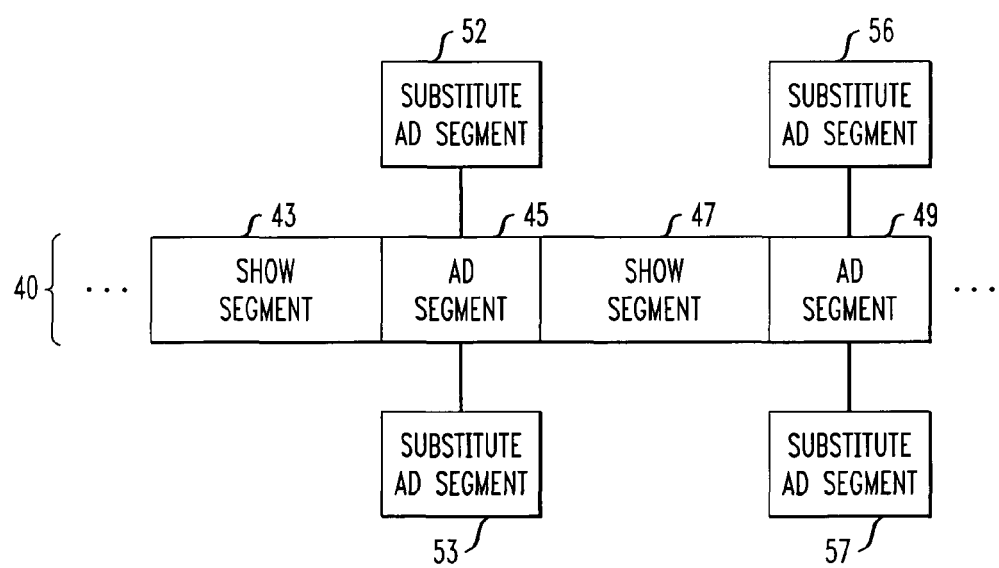
FIG. 1 illustrates a tree structure representing a TV show including regularly scheduled advertising segments and substitute advertisements shown in place of the advertising segments.

The invention is directed to delivering program materials and targeted advertisements to subscribers through a broadband communications network, e.g., a cable TV network. The program materials transmitted over such a network may comprise one or more broadcast programs, e.g., TV shows, which typically are interrupted by advertisements. In this illustrative embodiment, streams containing the program materials of various program channels are transmitted through the network in accordance with a switched broadcast technique. One such switched broadcast technique is described, e.g., in Patent Application Publication No. 20030056217 published Mar. 20, 2003, hereby incorporated by reference. As fully described below, using the switched broadcast technique, the cable TV network makes available to subscribers in the same service area selected program channels on an as needed basis. As a result, the number of program channels furnished here, although not simultaneously, may exceed the maximum number of carriers or transmission channels allowed in the network.

The term "transmission channel" used here should not be confused with "program channel." A "transmission channel" signifies a designated frequency band through which a stream containing program material is transmitted. On the other hand, a "program channel" signifies the source of the program material selected by a subscriber to view. For example, a subscriber may select program channel 18 to view program material provided by CBS, program channel 5 to view program material provided by FOX, program channel 7 to view program material provided by HBO, etc. In addition, as used herein, "program channel stream" refers to a stream containing program material provided by a respective program channel. "Program transmission channel" refers to a transmission channel through which a program channel stream is transmitted.

The aforementioned switched broadcast technique is particularly well-suited to targeted advertising. Because in accordance with such a technique, program channel streams are provided on an as needed basis, not all transmission channels in the network are utilized to transmit program channel streams all the time, resulting in one or more unused transmission channels in the network from time to time. The invention takes advantage of these unused transmission channels to transmit to subscribers alternate, targeted advertisements which, because of their short durations, do not occupy the unused transmission channels for an extended period of time anyway.

In accordance with the invention, when an upcoming advertisement break in a program is detected, one or more sets of substitute advertisements are generated in real time as alternates to the regularly-scheduled advertisements. The substitute advertisements may be generated based on demographic data descriptive of the subscribers currently receiving the program, i.e., the actual audience of the program. During the advertisement break, the sets of substitute advertisements are transmitted on unused transmission channels, respectively. A subscriber's STT may be directed to tune to a selected, unused transmission channel at the beginning of the advertisement break to receive a particular set of substitute advertisements, which may be targeted at the subscriber or his/her demographic group. Consequently, a first specified set of STTs may be directed to receive a first stream of substitute advertisements, a second specified set of STTs directed to receive a second stream of substitute advertisements, etc. After the advertisement break, those STTs having tuned away to receive substitute advertisements re-tune to the program transmission channel to receive the original programming.

FIG. 1 illustrates the principles of the invention using a simple tree structure. For example, trunk section 40 of the tree represents a program channel stream containing program material for a TV show that includes advertising segments (e.g., 45, 49) and TV show segments (e.g., 43 and 47). Advertising segments 45 and 49 represent regularly scheduled advertisements which are inserted into the stream by the provider of program material. One or more branches (two are shown here, e.g., 52, 53) extending from each advertising segment (e.g., 45) represent substitute advertising segments that may be shown in place of the segment. The advertisements in a substitute advertisement segment are targeted at a group of subscribers currently viewing the TV show that is identified by the cable operator as a distinct audience for the targeted advertisements. Accordingly, advertisements are shown to each individual viewer based on which group he or she is assigned to. Thus, in accordance with the invention, the cable operator may wish to show substitute advertising segments 52 and 56 to a first group, say, subscribers in households with young children. Advertising segments 53 and 57 are intended for subscribers in a second group, say, college students. If a subscriber watching the TV show is assigned to the first group, the subscriber will not see advertising segments 45 and 49, but instead will be shown segments 52 and 56. Similarly, if a subscriber watching the TV show is assigned to the second group, the subscriber will be shown segments 53 and 57, instead. In the case just described, the cable operator may wish to show the regularly scheduled advertising segments 45 and 49 to all individuals who are assigned neither to the first nor to the second groups.

Figure 2:
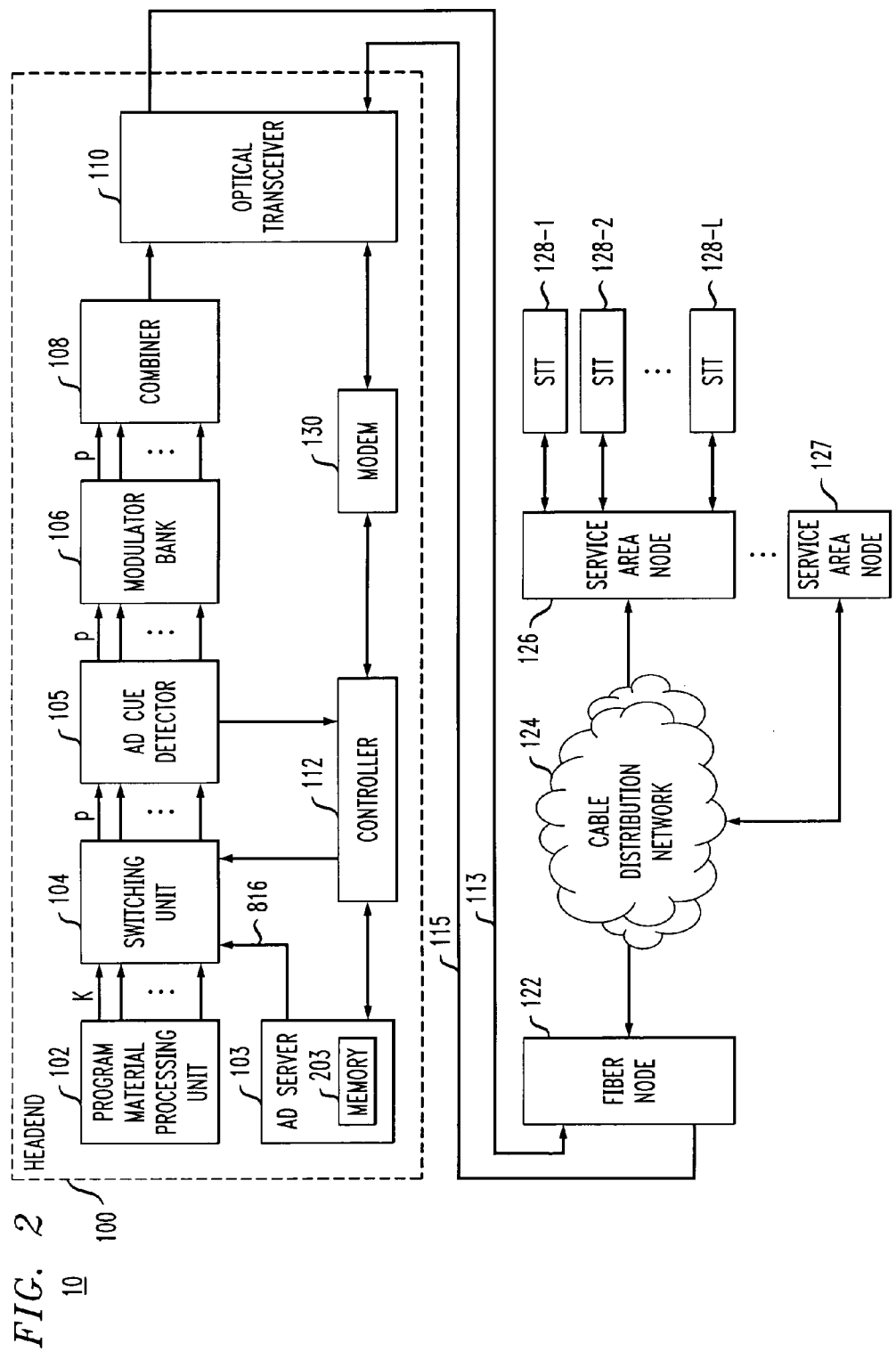
FIG. 2 illustrates a cable TV system in accordance with the invention.

FIG. 2 illustrates cable TV system 10 embodying the principles of the invention for providing program materials to STTs on subscriber premises. As shown in FIG. 2, system 10 includes headend 100, fiber node 122, cable distribution network 124, and service area nodes 126, 127, etc. Service area node 126 is connected to STTs 128-1 through 128-L in a neighborhood or service area, where L represents a predetermined number.

Downstream Transmissions

In headend 100, program material processing unit 102 receives program materials from various sources via satellites, terrestrial microwave transmissions, cable, etc. The program materials are processed by unit 102 to form K individual program channel streams in a digital format, where K is an integer. Each program channel stream contains program material, which requires a transmission channel having a specified frequency band for its distribution.

Switching unit 104, under control of controller 112, selectively switches a subset of the K program channel streams, say, p program channel streams (where p≠K), to p input ports of ad cue detector 105, respectively. The p program channel streams are selected in a manner described below. The p input ports of detector 105 are selected by controller 112 which correspond to the appropriate inputs of modulators in modulator bank 106 so that the p program channel streams, after being processed by detector 105, are modulated onto the respective p carriers assigned by controller 112.

Ad cue detector 105 processes the p program channel streams to detect signals indicating that an advertisement break is imminent in a stream. Such signals may include, e.g., cue messages placed in the program channel stream in accordance with industry standards. Ad cue detector 105 informs controller 112 if an upcoming advertisement break in a program channel stream is detected.

Ad cue detector 105 feeds the p program channel streams to the corresponding inputs of modulators in modulator bank 106. For example, in accordance with a quadrature amplitude modulation (QAM) scheme, the modulators modulate the respective streams onto different carriers corresponding to the modulators. The modulated carriers traverse transmission channels (also known as "in-band" channels) associated therewith, which may occupy a forward passband ranging from 50 MHz to 550 MHz of a coaxial cable.

FIG. 3 illustrates M carriers, $C_1$ through $C_M$, associated with M transmission channels in the forward passband, respectively, which are pre-selected for use in this instance. Since the forward passband is limited in bandwidth, M in this instance represents the maximum number of transmission channels that the forward passband can accommodate. As shown in FIG. 3, the carrier frequency of $C_1$ is denoted $CF_1$; the carrier frequency of $C_2$ is denoted $CF_2$; . . . ; and the carrier frequency of $C_M$ is denoted $CF_M$.

Combiner 108 combines the p modulated carriers to form a combined signal, which is fed to optical transceiver 110. The latter generates an optical signal representing the combined signal. The optical signal traverses optical fiber 113 to fiber node 122. A transceiver (not shown) in fiber node 122 which performs the inverse function to transceiver 110 converts the optical signal back to the combined signal in electrical form. The combined signal traverses cable distribution network 124 to one or more service area nodes (e.g., 126, 127). At each service area node (e.g., 126), the combined signal is multicast to one or more STTs in a service area, e.g., STTs 128-1 through 128-L.

In this instance, each STT in the service area contains a service table which associates the set of program channels, aggregately selected by the subscribers in that area, with the carriers from which the respective program channel materials can be obtained. For example, in response to a change in the selected program channels, controller 112 sends control messages, e.g., via a forward data channel (FDC) described below, to revise the service table in the STTs to reflect the new assignment of carrier frequencies to the latest set of program channels. Thus, based on such a service table, an STT can extract a desired program channel stream from the aforementioned combined signal by tuning to the corresponding carrier frequency. The program material is then derived in a well known manner from the extracted stream for viewing.

In addition to the in-band channels, downstream data, e.g., the aforementioned control messages and other system messages, may be communicated from headend 100 to STTs 128 via one or more FDCs, sometimes referred to as "out-of-band" channels. Such downstream data may be modulated by modem 130, e.g., in accordance with a quaternary phase shift keying (QPSK) scheme, onto the FDCs which may occupy the 70-130 MHz band of a coaxial cable.

Upstream Transmissions

Upstream data, communicated from STTs 128 to headend 100, may be modulated by a cable modem in an STT onto one or more reverse data channels (RDCs), which occupies a reverse passband, e.g., 5-40 MHz band, of a coaxial cable. The modulated upstream data is demodulated by modem 130 before the data is processed, e.g., by controller 112. Data carried in the RDCs may be modulated in accordance with a QPSK scheme.

In accordance with the switched broadcast technique, the STTs utilize the RDCs to inform controller 112 of a subscriber's program channel change event. For example, when a subscriber at an STT selects a different program channel to watch, a program channel change message is sent from the STT to controller 112. It should be noted at this point that each of set-top terminals 128-1 through 128-L is pre-assigned with an identifier for identifying the STT. In this instance, a media access control (MAC) address of the STT is used for such identification. Alternatively, an Internet protocol (IP) address of the STT may be used. FIG. 4 illustrates the program channel change message which includes, among others, STID field 402 containing an identifier (e.g., MAC address) identifying the originating set-top terminal, $PCH_{NEW}$ field 404 containing the newly-selected program channel number, $PCH_{OLD}$ field 406 containing the previously-selected program channel number, and destination field 408 contains the destination address to which the message is destined, which in this instance may be the MAC or IP address of controller 112.

Thus, for example, if the subscriber changes the program channel selection from channel 8 to channel 2 (or in other words "deselects" channel 8 in favor of channel 2), the value of $PCH_{NEW}$ field 404 would be set to "8" and that of $PCH_{OLD}$ field 406 would be set to "2." If the subscriber has just turned on the cable TV to watch program channel 9, the value of $PCH_{NEW}$ field 404 in that instance would be set to "9" and that of $PCH_{OLD}$ field 406 would be set to "0," indicating an off state. Conversely, if the subscriber who has been watching program channel 9 chooses to turn off the cable TV, the value of $PCH_{NEW}$ field 404 would be set to "0" and that of $PCH_{OLD}$ field 406 would be set to "9."

To keep track of the program channels currently selected by the STTs in a service area (e.g., STTs 128-1 through STT-L), controller 112 may maintain a table such as that shown in FIG. 5. Table 432 includes two columns 436 and 437, and comprises L rows 444-1 through 444-L, corresponding to the number of STTs in the service area. Column 436 lists STIDs for the respective STTs in the service area. Column 437 indicates a program channel X currently selected by a respective STT. A Null value is inserted in column 437 to indicate that a respective STT is in an "off" state. For example, referring to row 444-1, an STT, e.g., 128-1, whose STID is MAC 1 (representing its MAC address) is currently receiving program materials from program channel X=4. Referring to row 444-2 where X="NULL," the STT identified by MAC 2 is off and not receiving any program channel stream.

Dynamic Assignment of Carriers

In accordance with the switched broadcast technique, carriers are dynamically assigned to carry program materials of only those program channels selected by the STTs (or subscribers) in a service area. The number of program channels K that the cable TV system can provide, although not simultaneously, can exceed M, the maximum number of transmission channels that the forward passband can accommodate. That is, K can be greater than M in this instance.

Figures 6, 7, 8:
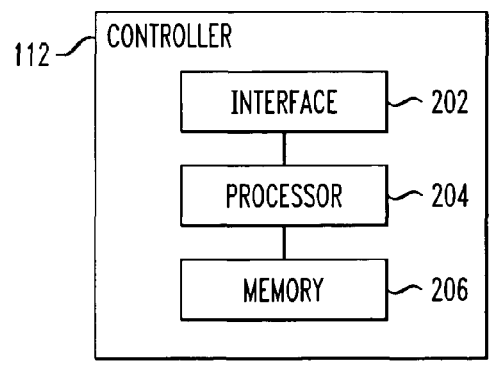
FIG. 6 illustrates components of the controller in the system of FIG. 2.
FIG. 7 illustrates a switching table used by the controller to manage the flow of program channel streams.
FIG. 8 illustrates an assignment table used by the controller to manage the dynamic assignment of carriers for transmitting program channel streams.

Referring to FIG. 6, controller 112 includes processor 204 of conventional design, which is connected to memory 206 and interface 202. Processor 204 receives, from one or more of STTs 128-1 through 128-L, program channel change messages via interface 202. If an STT changes to a new program channel that has not been selected by any STT in the service area, processor 204 assigns an unused transmission channel to transport the new program channel stream, and causes the stream to be switched to a respective input of ad cue detector 105, and thus to a corresponding input to modulator bank 106. In such case, processor 204 also transmits control messages, receivable by the STTs, to revise their service table described above to identify the frequency of the carrier carrying the new program channel stream.

Thus, controller 112 directs switching unit 104 to switch to the selected inputs of detector 105 the p streams corresponding to the p program channels currently selected by the STTs in the service area. Controller 112 specifies to unit 104 the selected inputs of detector 105 to which the p program channel streams are switched. To direct switching unit 104 in an efficient manner, controller 1112 may maintain a switching table associating each of the p program channel streams with a respective input port of ad cue detector 105. In one implementation, the input ports of ad cue detector 105 has a predetermined correspondence with the inputs of the modulators in modulator bank 106. For example, in accordance with this implementation, a program channel stream received by input port 1 of ad cue detector 105 is fed to the input of a first modulator in bank 106, which is associated with carrier $C_1$; a program channel stream received by input port 2 of ad cue detector 105 is fed to the input of a second modulator in bank 106, which is associated with carrier $C_2$; etc.

FIG. 7 illustrates switching table 377 which may be used by controller 112 to keep track of the input ports of detector 105 to which program channel X streams are assigned or switched. Table 377 comprises two columns 373 and 374. Column 373 lists each program channel X selectable by a subscriber through an STT; X ranges from 1 to K in this instance. Column 374 indicates an input port of ad cue detector 105 to which the corresponding program channel stream is assigned. Referring to row 371-2, for example, the program channel 2 stream in this instance is assigned to input port 3 of detector 105 (and is thus carried by carrier $C_3$, in accordance with the predetermined correspondence between the input ports of detector 105 and the inputs of modulators in bank 106). A "NULL" in column 374 indicates that the corresponding program channel stream currently is not switched to an input port of ad cue detector 105 as it is currently not selected by the STTs, and thus not transmitted, in the service area. For example, referring to row 371-1, the program channel 1 stream is not currently switched to any input port of ad cue detector 105.

To facilitate its dynamic assignment of transmission channels, controller 112 may also maintain an assignment table in memory 206. FIG. 8 illustrates such an assignment table (denoted 300), which includes columns 304, 306 and 308. Column 304 lists each program channel X selectable by a subscriber at an STT; X ranges from 1 to K in this instance. Column 306 tracks, for each program channel X, the number of subscribers (or STTs) in the service area which have selected to watch materials from that program channel ($N_{PCHX}$). Column 308 includes entries identifying the carriers assigned by processor 204 to carry the respective program channel X streams. Thus, with assignment table 300, processor 204 has knowledge that, for example, referring to row 311, carrier $C_3$ is assigned to carry the program channel 2 stream (X=2), which 12 subscribers ($N_{PCHX}$=12) have selected to watch. In addition, as indicated in row 313, no subscriber ($N_{PCHX}$=0) has chosen to watch material from program channel 1 (X=1). Thus, no carrier (Null) is assigned for program channel 1. That is, program channel 1 material is currently not being transmitted to service area node 126 and thus not currently made available to STTs 128-1 through 128-L.

Also relying on assignment table 300, controller 112 may retire a carrier carrying program channel X stream when $N_{PCHX}$ changes from a non-zero value to zero. The retired carrier is subject to reassignment by controller 112.

Targeted Advertising

Figure 9:
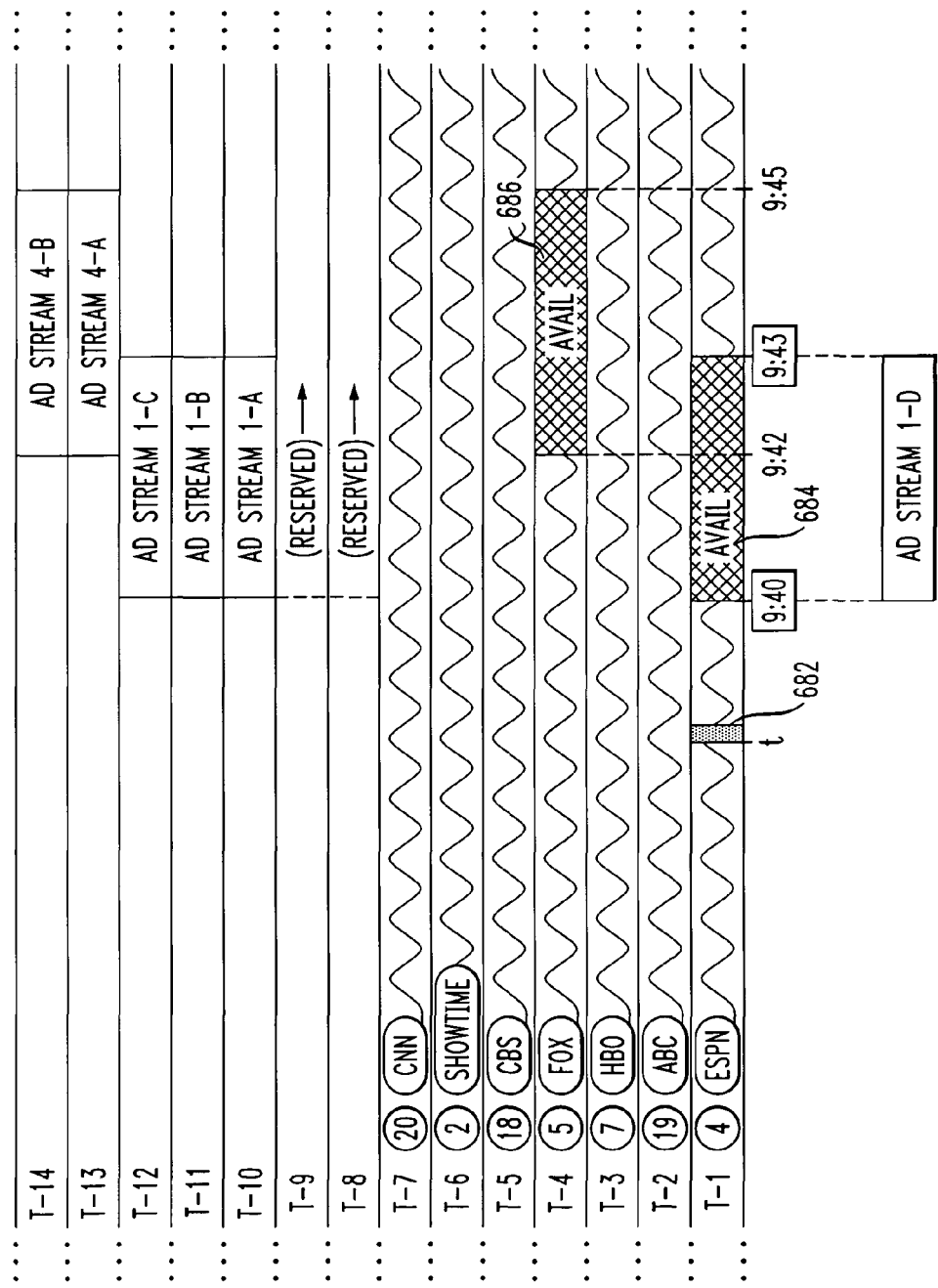
FIG. 9 illustrates schematically transmission channels for transmit program channel streams and targeted advertisement streams in accordance with the invention.

FIG. 9 illustrates M=14 transmission channels, denoted T-1 through T-14, for carrying program channel streams and advertising streams directed to a service area in this instance.

It should be noted that M=14 here is for illustrative purposes only, cable TV system 10 may include more or fewer transmission channels.

As illustrated in FIG. 9, at time t, transmission channels T-1 through T-7 are assigned to carry, respectively, p=7 program channel streams for program channels 4, 19, 7, 5, 18, 2 and 20 while transmission channels T-8 through T-14 are unused. For purposes of illustration, in FIG. 9 program channels 4, 19, 7, 5, 18, 2 and 20 are associated, respectively, with the ESPN, ABC, HBO, FOX, CBS, SHOWTIME, and CNN services.

According to one aspect of the present invention, ad cue detector 105 monitors each of the program channel streams that are currently being transmitted, and detects that an advertisement break is imminent. When ad cue detector 105 detects an upcoming advertisement break in one of the p program channel streams currently being broadcast, it notifies controller 112. Based on table 432, controller 112 compiles a list of those STTs in the service area which are currently receiving the program channel stream in question. This group of STTs is referred to herein as the "targeted STTs." Controller 112 informs ad server 103 how many transmission channels are available for conveying streams containing advertisements targeted at the subscribers of the targeted STTs. Ad server 103 then generates one or more targeted advertisement streams, conveyed by one or more of the available transmission channels, respectively.

Ad cue detector 105 in this instance monitors the program channel streams carried on transmission channels T-1 through T-7 for cues messages, indicating an upcoming advertisement break. Standards for the insertion of such cue messages are established by the American National Standard ANSI/SCTE 35 2001 (formerly DVS 253), Digital Program Insertion Cueing Messages for Cable (May 8, 2001) referred to herein as the DVS 253 Standard, which is incorporated by reference herein. Cable programming services generally provide time space during a broadcast program for use by cable operators. These time spaces are often sold by cable operators to local advertisers or used for channel self-promotion. Each of these time spaces is referred to as an "avail," and is demarcated by "splice points" in the program channel stream. For example, splice information may be provided in a splice information table associated with a particular program and/or in a cue message in the program channel stream. The splice table and cue messages may be sent multiple times. For example, a cue message may be sent 8, 5, 4 and 2 seconds prior to the splice event. Messages that comply with the SCTE standards are referred to herein as digital program insertion (DPI) cues or DPI messages. In this instance, cue messages are inserted in a program channel stream to give advance notice of an avail, which may provide details as to the start and end times of the avail, the number of advertisements in the avail, etc.

Figure 10:
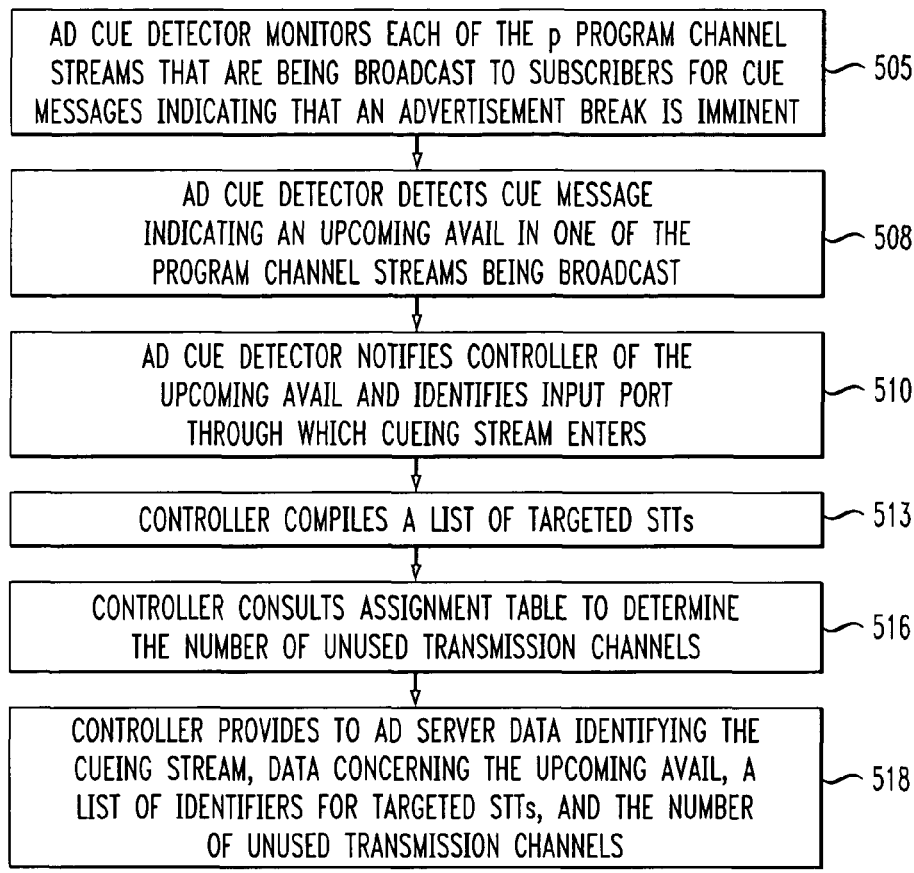
FIG. 10 is a flowchart describing a process for detecting an upcoming advertising break in a respective program channel stream currently being broadcast, and generating information concerning the STTs that are currently receiving the respective program channel stream.

Referring to FIG. 10 as well as FIG. 9, at step 505, ad cue detector 105 monitors each of the p program channel streams that are being transmitted for cue messages indicating that an advertisement break is imminent. For example, at step 508, ad cue detector 105 detects a cue message indicating an upcoming avail in one of the program channel streams being transmitted to subscribers. The term "cueing stream" is used herein to refer to a stream in which ad cue detector 105 detects a cue message indicating an upcoming avail. Referring to FIG. 9, in this instance ad cue detector 105 at t detects cue message 682 in the program channel 4 stream, which is transported on transmission channel T-1. By way of example, cue message 682 indicates that upcoming avail 684 is scheduled to begin at 9:40 p.m. and will end at 9:43 p.m.

At step 510, ad cue detector 105 notifies controller 112 of the upcoming avail, and identifies to controller 112 the input port (e.g., input port 1 corresponding to transmission channel T-1) through which the cueing stream enters detector 105. At step 513, controller 112 compiles a list of targeted STTs. Specifically, controller 112 relies on table 377 to translate the identification of the input port (input port 1) of detector 105 to the identity of program channel X (X=4) with which the cueing stream is associated. In addition, controller 112 consults table 432 to identify the targeted STTs, i.e., those STTs (e.g., STT having STID=MAC 1) which are receiving program channel 4 stream, which is the cueing stream in this instance. Controller 112 generates a list of the targeted STTs identified by their STIDs, in a form that is receivable by ad server 103.

At step 516, controller 112 consults assignment table 300 to determine the number of unused transmission channels. This calculation may be performed by determining the difference between the number of transmission channels that are currently assigned, as indicated in column 308 of table 300, and the total number of transmission channels, M. In this instance controller 112 determines that seven transmission channels are unused (T-8 through T-14).

Controller 112 may reserve one or more unused transmission channels to ensure that capacity is available in the event a subscriber in the service area selects a new program channel for which no program channel stream is currently being provided to the service area. In this instance controller 112 reserves transmission channels T-8 and T-9 to provide capacity for the cable network in the event new program channel streams are requested by subscribers during avail 684. Accordingly, five transmission channels (T-10 through T-14) remain unused and are available for transmission of targeted advertisement streams.

At step 518, controller 112 communicates with ad server 103 and provides information including data identifying the cueing stream, data concerning the upcoming avail, a list of identifiers for targeted STTs, and the number of unused transmission channels for transmission targeted advertisement streams. Controller 112 directs ad server 103 to generate one or more streams containing targeted advertisement for the targeted STTs. Referring to FIG. 9, in this instance, controller 112 in this instance notifies ad server 103 that an avail will occur between 9:40 p.m. and 9:43 p.m. on program channel 4 stream, and that five transmission channels are available for targeted advertisements. Controller 112 also provides to ad server 103 the MAC addresses of the targeted STTs that are currently receiving the program channel stream associated with program channel 4 (i.e., the ESPN service).

Ad server 103, among others, generates streams of targeted advertisements in response to the directives and data received from controller 112. Ad server 103 may be a server system comprising one or more software applications. As shown in FIG. 2, ad server 103 also comprises memory 203 which may contain a catalog of targeted advertisements and one or more databases for generating targeted advertisements, and server 103 may have access to the targeted advertisements using the catalog.

According to another aspect of the invention, ad server 103 obtains demographic data associated with the targeted STTs from one of the databases, analyzes the demographic data to identify one or more demographic groups, determines the number of unused transmission channels for carrying targeted advertisements to the targeted STTs and generates a stream of targeted advertisements for each transmission channel determined to be used.

Figure 11:
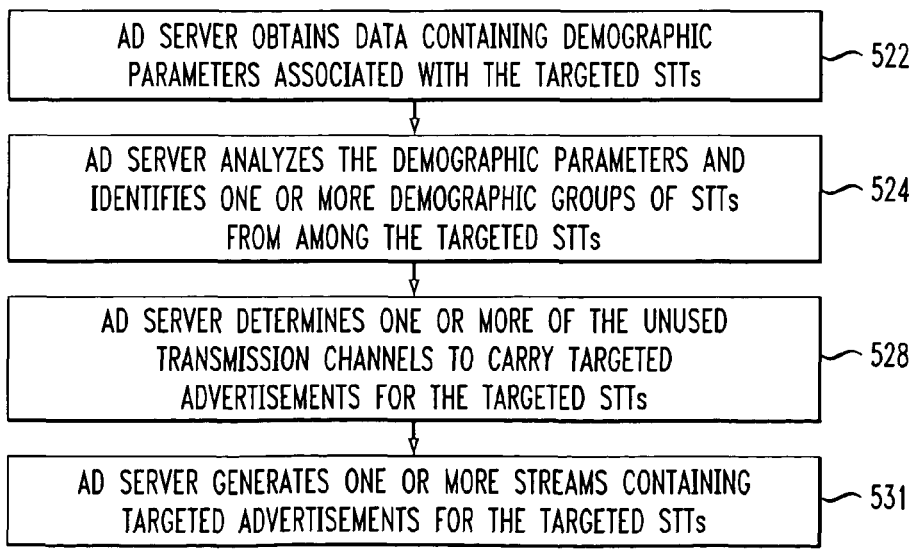
FIG. 11 is a flowchart describing a process for identifying one or more demographic groups among subscribers viewing a certain program channel, assigning one or more unused transmission channels for conveying targeted advertisements to the subscribers, and generating a stream of targeted advertisements for each assigned transmission channel.

FIG. 11 is a flowchart that depicts various steps performed by ad server 103 in carrying out this aspect of the invention. At step 522, ad server 103 obtains data containing demographic parameters associated with the targeted STTs. In one implementation, ad server 103 utilizes the list of targeted STTs provided by controller 112 to access a demographic parameter database maintained by ad server 103. FIG. 12 illustrates the data structure of a demographic parameter database 620 that may be used to store demographic information for various STTs in a service area, e.g., STTs 128-1 through 128-L. Demographic parameter database 620 includes one or more STT records each corresponding to a respective STT in the service area. Each row in database 620 corresponds to a single STT record. Each STT record comprises a plurality of fields, each of which includes information pertaining to the respective STT. The demographic parameter database is structured so that a given STT record may be indexed, identified and retrieved based on an identifier associated with the respective STT. In this instance, database 620 comprises L STT records 645-1 through 645-L. Referring to record 645-1, for example, the first field 652 holds the MAC address of a respective STT for its identification, e.g., STT 128-1 identified by MAC 1. Additional fields 653-656 hold data representing various demographic parameters associated with STT 128-1. For example, field 653 may hold data indicating the age of one or more subscribers associated with STT 128-1. Field 654 may hold data indicating the sex of one or more subscribers. Field 655 may indicate a household income associated with STT 128-1. Field 656 may indicate a primary language of the household that uses STT 128-1. It should be noted that these examples are intended for illustrative purposes only.

It should be further noted that the structure of database 620 shown in FIG. 10 is intended for illustrative purposes only. In other implementations, a demographic parameter database may comprise any number of STT records, and an STT record may comprise any number of parameter fields.

Returning to FIG. 11, at step 524, ad server 103 analyzes the demographic parameters obtained from database 620, and the data received from controller 112 concerning the number of unused transmission channels, and server 103 identifies one or more demographic groups of STTs from among the targeted STTs. Each group corresponds to a group of subscribers having similar demographic characteristics. Continuing with the above example where the program channel 4 stream is the cueing stream, controller 112 in this instance conveys to ad server 103 the MAC addresses of 1000 targeted STTs ($N_{PCH4}$=1000) which are currently receiving the cueing stream and have different demographic characteristics. Ad server 103 may determine that the 1000 targeted STTs contains a number of identifiable demographic groups that is smaller than or equal to the number of unused transmission channels. In this instance, once ad server 103 identifies one or more demographic groups, each of the targeted STTs is associated with one of the demographic groups.

FIG. 12 shows schematically, of STTs 128-1 through 128-L in the service area, the 1000 targeted STTs which are singled out in set 673. Ad server 103 identifies, based on demographic data obtained from database 620, and the list of targeted STTs and the number of unused transmission channels for targeted advertising from controller 112, four demographic groups 675-678 among the targeted STTs in set 673. For example, group 675 includes, among others, STTs 128-4, 128-17, 128-23, 128-24, and 128-45.

The manner by which ad server 103 identifies demographic groups is determined by the particular implementation. For example, groups 675-678 may be: (1) single men aged 18-25, (2) men aged 35-50, (3) women aged 50-65 and (4) individuals with annual income in excess of $50,000. Ad server determines if any STT in set 673 qualifies for more than one group (such as (3) and (4)) and assigns such STTs to a single group based on predetermined criteria by the cable operator. It should be noted that the groups (1)-(4) defined above are for illustrative purposes only.

Returning to FIG. 11, at step 528, ad server 103 determines one or more of the unused transmission channels to carry targeted advertisements for the targeted STTs. To determine how many of the unused transmission channels to be used, ad server 103 may consider a variety of factors. If the number of demographic groups associated with the targeted STTs is smaller than the number of unused transmission channels, ad server 103 may allocate one unused transmission channel to each group. For example, if the number of groups is four, and the number of unused transmission channels is five, ad server 103 may allocate one unused transmission channel to each of the four identified groups.

However, in some cases, ad server 103 may identify a number of demographic groups that exceeds the number of unused transmission channels. In such case, ad server 103 assigns unused transmission channels based on priorities established by the cable operator. For example, if the number of groups is four, but the number of unused transmission channels is only two, ad server 103 may prioritize the groups according to parameters established by the cable operator. Ad server 103 may, for example, allocate one unused transmission channel to each of the two largest demographic groups. Ad server 103 may additionally allocate the program transmission channel carrying the cueing stream to the third largest demographic group to substitute the corresponding targeted advertisements for the regularly scheduled advertisements in the cueing stream.

Ad server 103 may additionally determine how many avails are expected to occur in other program channel streams during the upcoming avail on the cueing stream. Cable operators may receive information concerning the scheduling of avails in advance, especially in regularly scheduled programs; such information may be stored in a schedule of avails in memory 203 in ad server 103. Using such information, ad server 103 can in some cases predict with reasonable accuracy an expected number of avails for any given time period. Avails are relatively easy to predict at certain times, such as at the top and bottom of each hour. Accordingly, if a cue message indicates that an avail will begin on a particular cueing stream at, say, 8:59 p.m., and end at 9:03 p.m., ad server 103 may reserve a relatively large number of unused transmission channels for that period for other potential cueing streams.

Thus, if an avail is expected in another program channel stream, ad server 103 may reserve one or more of the unused transmission channels to carry targeted advertisements to the STTs that are receiving the other program channel stream. Referring to FIG. 9, ad server 103 expects avail 686 to occur between 9:42 p.m. and 9:45 p.m. in the program channel stream corresponding to program channel 5 (FOX). This time period overlaps with that of avail 684 scheduled on the program channel 4 (ESPN). Accordingly, ad server 103 in this instance reserves two of the five unused transmission channels to carry targeted advertisements, during avail 686, to those STTs receiving the program channel 5 stream.

Ad server 103 may, in some cases, identify two or more program channel streams in which an avail is expected, and identify one or more demographic groups associated with each program channel stream such that the total number of demographic groups exceeds the number of unused transmission channels. In such case, ad server 103 allocates unused transmission channels in accordance with priorities established by the cable operator. For example, one avail may be expected in a first program channel stream showing a very popular TV show (with a large number of viewers), while another avail is expected to occur concurrently in a second program channel stream having a substantially smaller number of viewers. Ad server 103 may in such case assign all unused transmission channels to carry targeted advertisements to viewers of the popular TV show.

At step 531 in FIG. 11, ad server 103 generates one or more streams containing one or more targeted advertisements for the targeted STTs. To generate a stream, ad server 103 selects advertisements targeted at the corresponding demographic group. The method by which advertisements are chosen to reach a given audience depends on the particular implementation. For example, referring to FIGS. 9 and 13, ad server 103 generates targeted advertisement stream 1-A containing advertisements targeted at, say, group 675. Ad server 103 additionally generates targeted advertisement streams 1-B, 1-C and 1-D targeted at groups 676, 677, and 678, respectively.

At this point, ad server 103 communicates to controller 112 information indicating how many unused transmission channels server 103 has determined to carry targeted advertisements for the targeted STTs, which group of STTs for which each targeted advertisement streams is intended, and the input ports of switching unit 104 to which ad server 103 feeds the respective advertisement streams. Following the example provided above, ad server 103 informs controller 112 that advertisement stream 1-A at a first input port of unit 104 is intended for the STTs in group 675, advertisement stream 1-B at a second input port of unit 104 is intended for the STTs in group 676, etc. Ad server 103 transmits the various targeted advertisement streams to switching unit 104 to the respective ports through path 816. It should be noted that path 816 here represents multiple links for carrying multiple streams of targeted advertisements. In this instance, controller 112 dynamically assigns three unused transmission channels (T-10, T-11 and T-12), in addition to the program transmission channel (T-1) carrying the cueing stream, to carry the four targeted advertisement streams (i.e., 1-A, 1-B, 1-C and 1-D) provided at the respective input ports of switching unit 104. Controller 112 then causes unit 104 to switch at 9:40 p.m. the targeted advertisement streams to the respective input ports of ad cue detector 105 corresponding to the assigned transmission channels and the program transmission channel.

In accordance with yet another aspect of the invention, controller 112 directs the targeted STTs in groups 675, 676 and 677 to tune to the assigned transmission channels (T-9, T-10 and T-11) for the duration of avail 682 to receive the respective targeted advertisement streams transmitted through the channels. To that end, controller 112 transmits control messages receivable by the targeted STTs. Each control message may include an STID identifying each STT for which the message is intended, and, for each intended STT, an assigned transmission channel to which it should tune at a specified start time till a specified end time, where the start and end times correspond to those of the avail. The control messages are transmitted over one or more FDCs. In an alternative implementation, the control messages are transmitted over the program transmission channel carrying the cueing stream. In this example, the control messages may direct the targeted STTs in groups 675, 676 and 678 to tune to transmission channels T-10, T-11, and T-12, respectively. The control messages additionally indicate that avail 684 is scheduled to begin at 9:40 and end at 9:43 p.m.

Each of STTs 128-1 and 128-L in the service area determines whether one such control message is intended for the STT by checking for its STID in the control message, as indicated at step 720 in FIG. 14. If not, the subject routine returns to step 720. Otherwise, the STT at step 723 reads information concerning its assigned transmission channel in the control message, and the start and end times of the upcoming avail. At step 726, the STT tunes to its assigned transmission channel at the start time of the avail to receive the targeted advertisement stream from the assigned channel. At step 730, the STT re-tunes to the original program transmission channel at the end time of the avail, and as a result, the STT returns to the original programming.

Returning briefly to FIG. 9, at 9:42 p.m., as soon as avail 686 is ascertained, controller 112 similarly causes ad server 103 to generate advertisement streams 4-A and 4-B targeted at groups of subscribers currently viewing the FOX program channel. Controller 112 causes targeted advertisement streams 4-A and 4-B to be transmitted through transmission channels T-13 and T-14, respectively, between 9:42 p.m. and 9:45 p.m., to coincide with avail 686 on the FOX program channel.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the network transport is illustratively realized using cable distribution network 124. However, other networks such as digital subscriber line (DSL) networks, ethernet networks and satellite networks may be used, instead.

Finally, system 10 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for delivery of programming content to a plurality of user terminals over a communications network, comprising:

detecting an indicator at a first time during playback of particular programming content indicative of an advertising event therein, the advertising event comprising a first advertisement directed to a first demographic associated with the particular programming content for substitution with a targeted advertising content directed to a second demographic different than the first demographic;

in response to the detection of the indicator, generating a list of individual ones of the plurality of user terminals currently tuned to the particular programming content;

obtaining the second demographics data descriptive of at least one group of members of the list;

at the first time during the playback of the particular programming content, generating in real time the targeted advertising content based at least on the second demographics data; and providing, to the at least one group, the targeted advertising content in lieu of at least a portion of the first advertisement during the advertising event at the first time via an unused transmission channel;

wherein the unused transmission channel is identified by determining a difference between a total number of assigned channels and a total number of channels.

2. The method of claim 1, wherein the indicator contains a message which comprises a start time of the advertising event.

3. The method of claim 1, further comprising:
   identifying available transmission channels in the network; and
   transmitting the targeted advertising content over at least one of the available transmission channels.

4. The method of claim 1, wherein the advertising event comprises an advertisement break.

5. The method of claim 1, wherein the indicator comprises a digital program insertion (DPI) cue.

6. The method of claim 1, wherein the targeted advertising content comprises one or more advertisements.

7. The method of claim 1, wherein the network comprises a two-way multi-channel delivery network.

8. The method of claim 1, wherein the network comprises a cable television network.

9. A method for delivering a program stream containing programming material over a communications network to a plurality of user terminals, comprising:
   detecting, in the program stream, a cue message indicating a scheduled programming segment, the programming segment being scheduled during the program stream and comprising a first advertisement directed to a first demographic for substitution with a targeted advertising content directed to a second demographic different than the first demographic;
   in response to a detection of the cue message, identifying a set of user terminals currently receiving the program stream;
   identifying one or more groups of user terminals within the set of user terminals currently receiving the program stream;
   generating, subsequent to and based at least in part on identifying one or more groups of user terminals within the set of user terminals currently receiving the program stream, one or more data streams containing the targeted advertising content;
   directing at least one user terminal in a selected one of the one or more groups to tune from a first transmission channel to a second transmission channel at the start of the scheduled programming segment, the act of directing comprising enabling at least one other one of the set of user terminals not in the selected one or more groups to remain tuned to the first transmission channel, the second transmission channel comprising an unused transmission channel;
   transmitting the targeted advertising content over the second transmission channel; and
   directing the at least one user terminal in the selected one of the groups to re-tune to the first transmission channel at the end of the scheduled programming segment;
   wherein the unused transmission channel is identified by determining a difference between a total number of assigned channels and a total number of channels.

10. The method of claim 9, wherein the cue message comprises a start time of the scheduled programming segment.

11. The method of claim 9, wherein the cue message comprises a digital program insertion (DPI) cue.

12. The method of claim 9, wherein the one or more groups are identified by analyzing demographic data associated with the user terminals in the set.

13. The method of claim 9, wherein the one or more groups are identified as a function of at least a number of available transmission channels in the network.

14. The method of claim 13, wherein the one or more groups are identified also as a function of a number of additional scheduled programming segments expected to occur concurrently with the scheduled programming segment.

15. The method of claim 13, wherein the one or more groups are identified also as a function of a number of additional program streams expected to be delivered concurrently with the program stream during the scheduled programming segment.

16. The method of claim 15, wherein the additional program streams utilize a subset of the available transmission channels.

17. The method of claim 13, further comprising determining a subset of the available transmission channels for carrying the targeted advertising content.

18. The method of claim 9, wherein the network comprises a two-way multi-channel delivery network.

19. The method of claim 9, wherein the network comprises a cable television network.

20. A system configured to deliver a program stream containing programming material over a communications network to a plurality of user terminals, comprising:
   a module configured to dynamically assign transmission channels;
   a detector configured to detect, in the program stream, a message that indicates a scheduled programming segment comprising a first advertisement directed to a first demographic that can be substituted with a targeted advertising content directed to a second demographic different than the first demographic;
   a processing unit responsive to a detection of the message configured to identify a plurality of user terminals that currently receive the program stream, and group the identified plurality of terminals into one or more groups based on at least one characteristic;
   a server configured to generate the targeted advertising content containing one or more alternate programming segments for substitution with the scheduled programming segment within the program stream, the alternate programming segment not being present in a programming schedule prior to the act of detecting; and
   a transmission system configured to provide the targeted advertising content over an unused transmission channel transmission channel to a selected one of the groups;
   wherein the unused transmission channel is identified by determining a difference between a total number of assigned channels and a total number of channels.

21. The system of claim 20, wherein the message includes a start time of the scheduled programming segment.

22. The system of claim 20, wherein the message includes a digital program insertion (DPI) cue.

23. The system of claim 20, wherein at least one user terminal in the selected group is directed to tune from a first transmission channel to a second transmission channel at the start of the scheduled programming segment, and to re-tune to the first transmission channel at the end of the scheduled programming segment, the targeted advertising content being transmitted over the second transmission channel.

24. The system of claim 20, wherein the at least one characteristic comprises demographic data associated with the user terminals in the plurality.

25. The system of claim 20, wherein the number of the one or more groups is further based at least in part on a number of additional scheduled programming segments expected to occur concurrently with the scheduled programming segment.

26. The system of claim 20, wherein the number of the one or more groups is further based at least in part on a number of additional program streams expected to be delivered concurrently with the program stream during the scheduled programming segment.

27. The system of claim 26, wherein the additional program streams utilize a subset of the available transmission channels.

28. The system of claim 20, wherein a subset of the available transmission channels for carrying the one or more data streams is determined.

29. The system of claim 20, wherein the network includes a two-way multi-channel delivery network.

30. The system of claim 20, wherein the network includes a cable TV network.

31. A system configured to provide targeted advertisements over a communications network, the communications network comprising a plurality of transmission channels, a selected one of the transmission channels delivering at least a program stream containing programming content to one or more of a plurality of users according to a schedule, the system comprising:

a detector in communication with a content source and configured to detect an indicator indicative of an advertising segment within the programming content directed to a first demographic for substitution with a targeted advertising content directed to a second demographic different than the first demographic;

a processing unit responsive to a detection of the indicator and configured to generate a list comprising only an audience receiving the programming content during a scheduled presentation of the programming content, one or more groups of the audience being identified;

a server in communication with the network and the processing unit and configured to allocate one or more unused transmission channels for conveying the targeted advertising content, a number of available transmission channels allocated being a determined by identifying a difference between a number of the one or more groups and a number of program channels currently being requested by the audience during the scheduled presentation of the programming content and a number of total program channels; and a transmission system in communication with the network and configured to provide, over the allocated one or more transmission channels, the targeted advertising content;

wherein the targeted advertising content is not present within a programming schedule prior to the act of detecting; and wherein the available transmission channels comprise transmission channels which are allocated using switched broadcast techniques.

32. The system of claim 31, wherein the indicator contains a message which includes a start time of the advertising segment.

33. The system of claim 31, wherein the indicator includes a digital program insertion (DPI) cue.

34. The system of claim 31, wherein the network includes a two-way multi-channel delivery network.

35. The system of claim 31, wherein the network includes a cable TV network.

* * * * *